Figure 5:
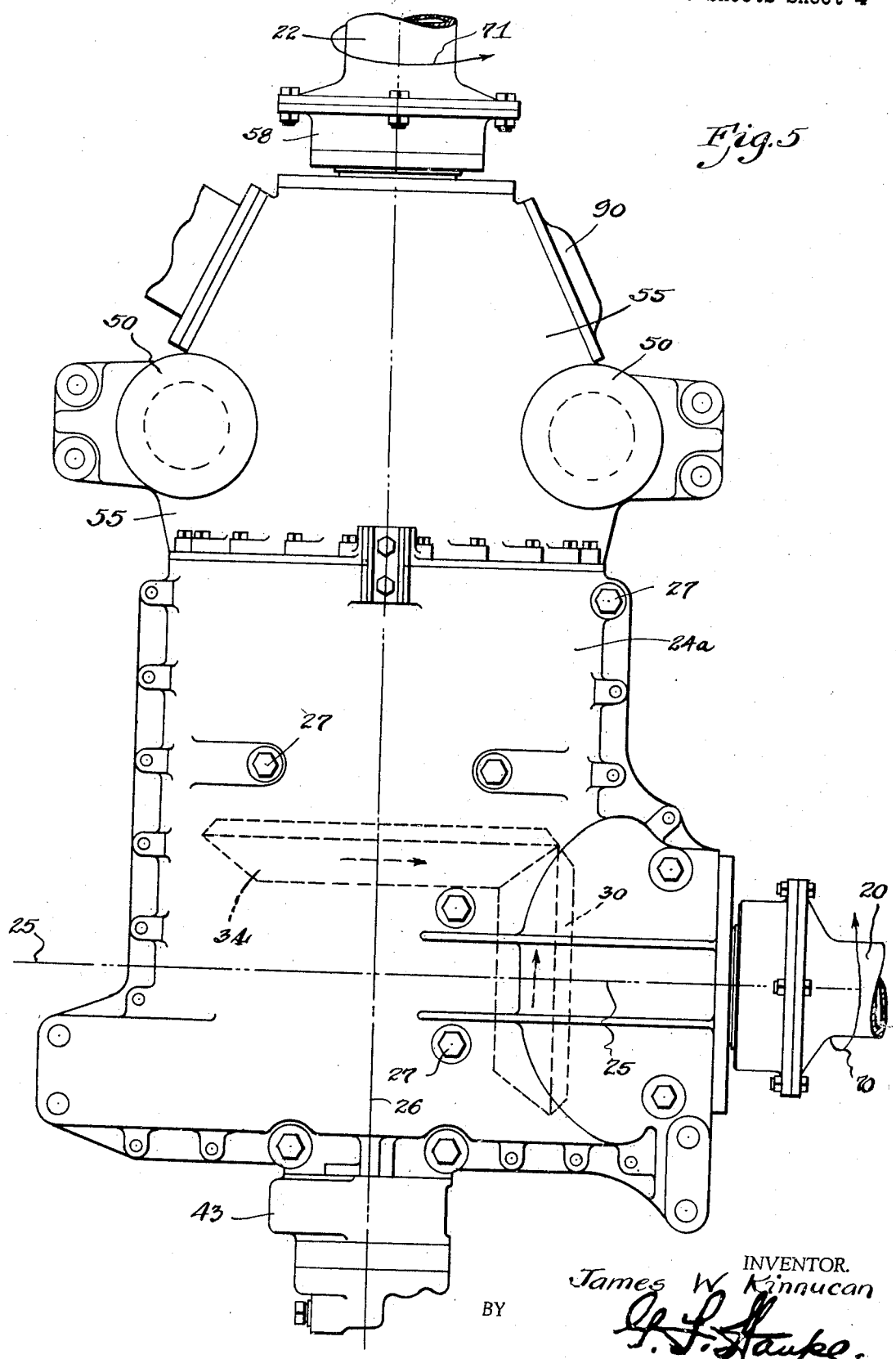

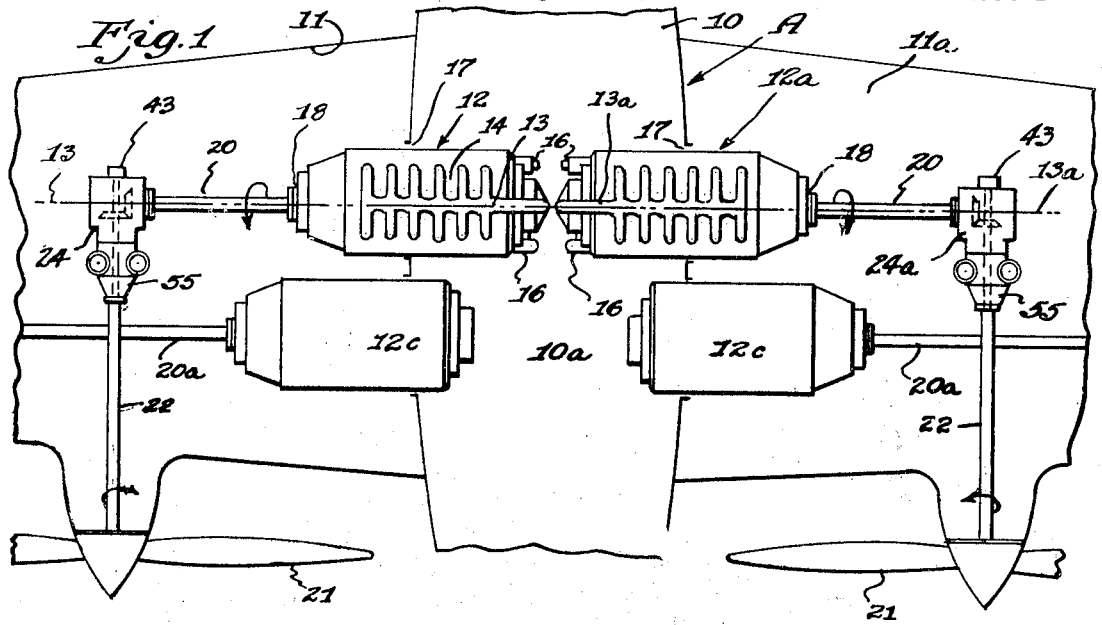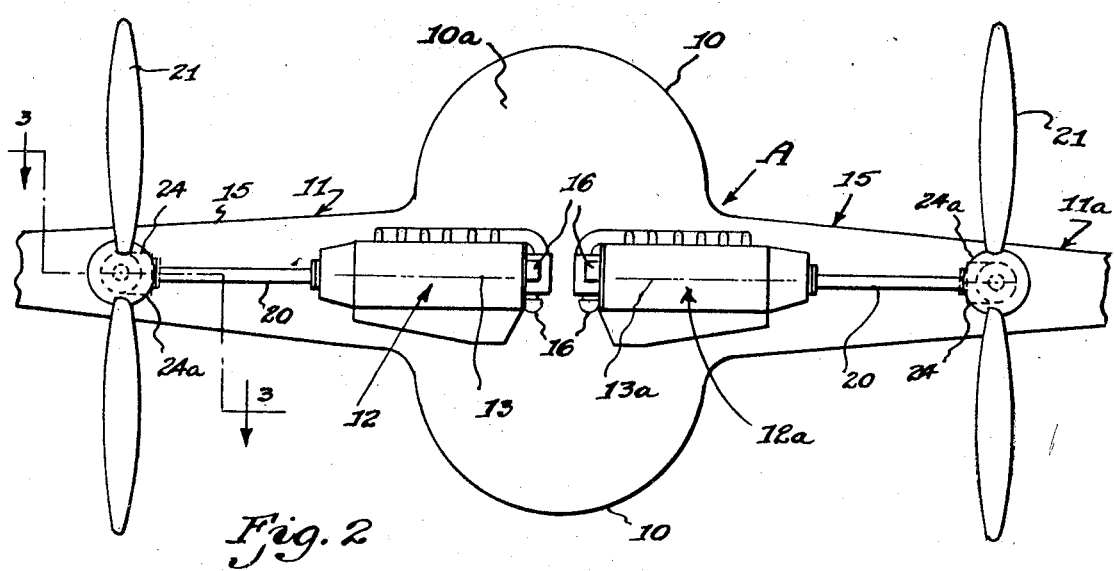

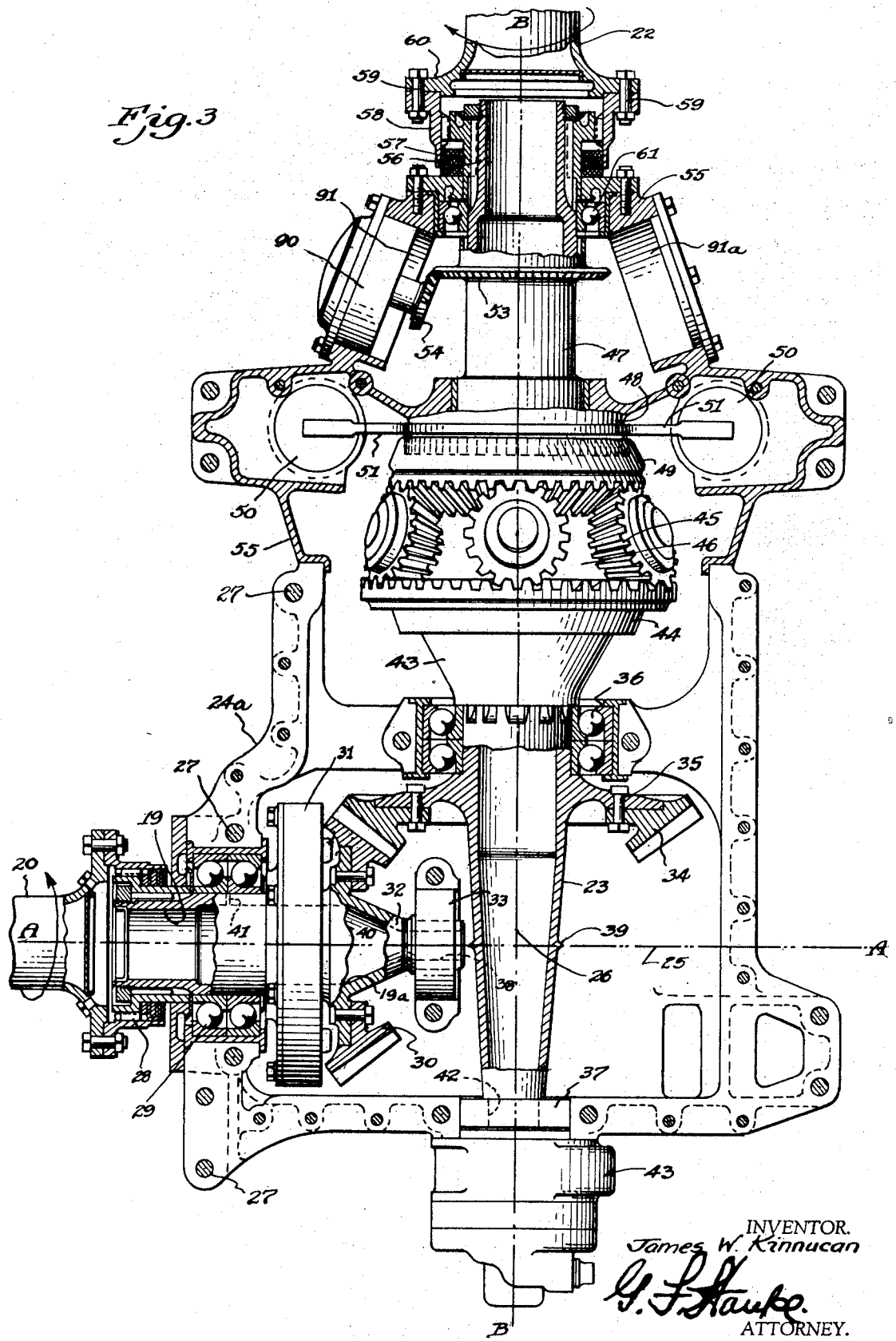

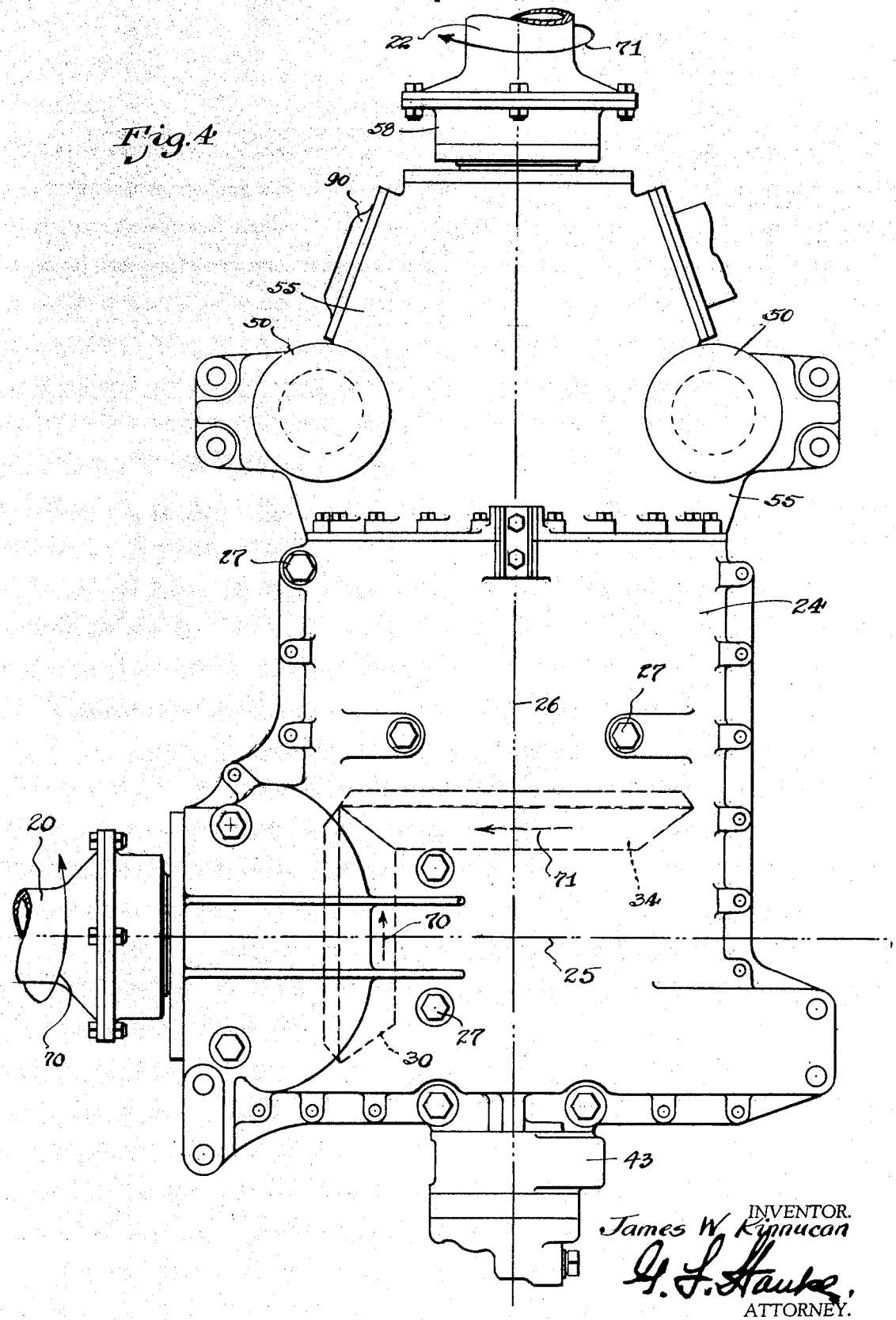

Feb. 29, 1944.   J. W. KINNUCAN   2,342,672
AIRCRAFT POWER PLANT AND PROPELLER DRIVE
Filed April 23, 1940   5 Sheets-Sheet 5

Outlets to Pump

INVENTOR.
James W. Kinnucan
BY
ATTORNEY

Patented Feb. 29, 1944

2,342,672

UNITED STATES PATENT OFFICE 2,342,672

AIRCRAFT POWER PLANT AND PROPELLER DRIVE

James W. Kinnucan, Detroit, Mich., assignor, by mesne assignments, to Continental Aviation and Engineering Corporation, a corporation of Virginia Application April 23, 1940, Serial No. 331,201

4 Claims. (Cl. 74—389)

My invention relates to aircraft and more particularly to the assembly therewith of an aircraft power plant, one assembly of which is herein illustrated, same being especially adapted for assembly with large bombing and/or transport planes and other aircraft employing multiple engines.

It will be realized that more efficient aircraft operation, higher speeds and greater carrying capacity may be had in the larger type of aircraft, when the power plant is housed substantially within the wing structure. Such an assembly is particularly advantageous since there is a minimum of resistance to the air stream and thus there is attained a maximum of lift for a minimum expenditure of power.

An object of my present invention is to improve aircraft efficiency by providing an improved assembly of the aircraft power plant within the aeroplane structure.

Another object of my invention is to improve the operating characteristics of aircraft by providing a power plant assembly comprising means for supporting the engines in such a way as to facilitate servicing, by providing means which permit adjustments to be readily made, particularly adjustments and regulation of the accessories and connections while in flight.

A further object of my invention is to provide an improved assembly of an aircraft power plant with a heavier-than-air aircraft by providing an engine constructed and arranged to be housed substantially within the wing structure, which is positioned to extend longitudinally of the wing structure, and to drivingly connect the engine with a propeller shaft extending at an angle to the longitudinal axis of the engine, said propeller shaft preferably projecting through the forward or leading edge of the wing structure and including a reduction drive mechanism.

A further object of my invention is to provide a structural assembly of an angle propeller shaft drive comprising gearing connecting driving and driven shafts which extend at an angle, and to accomplish this with a minimum of parts while providing a rugged structure capable of giving long life. The present construction is particularly adapted for assembly within the wing structure of a heavier-than-air aircraft, and provides improved aircraft operating characteristics.

A still further object of my invention is to provide a transmission structure including a gear box and an angle gear drive for driving the propeller of an aircraft, which is mounted on a propeller shaft extending through the leading edge of the wing structure and which is connected with an internal combustion engine of the type having cylinders whose axes lie in a plane substantially parallel to the wing surface, and having a crankshaft extending longitudinally of the wing structure, by providing a structural assembly permitting the use of one gear box for supporting gearing adapted for assembly with engines rotating in reverse directions.

Figure 6:
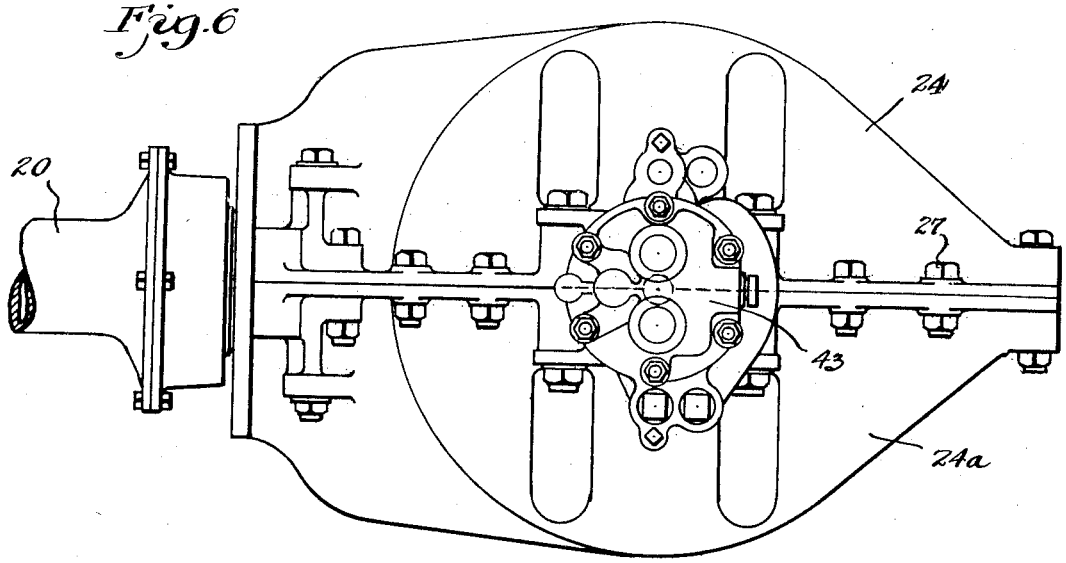
Figure 7:
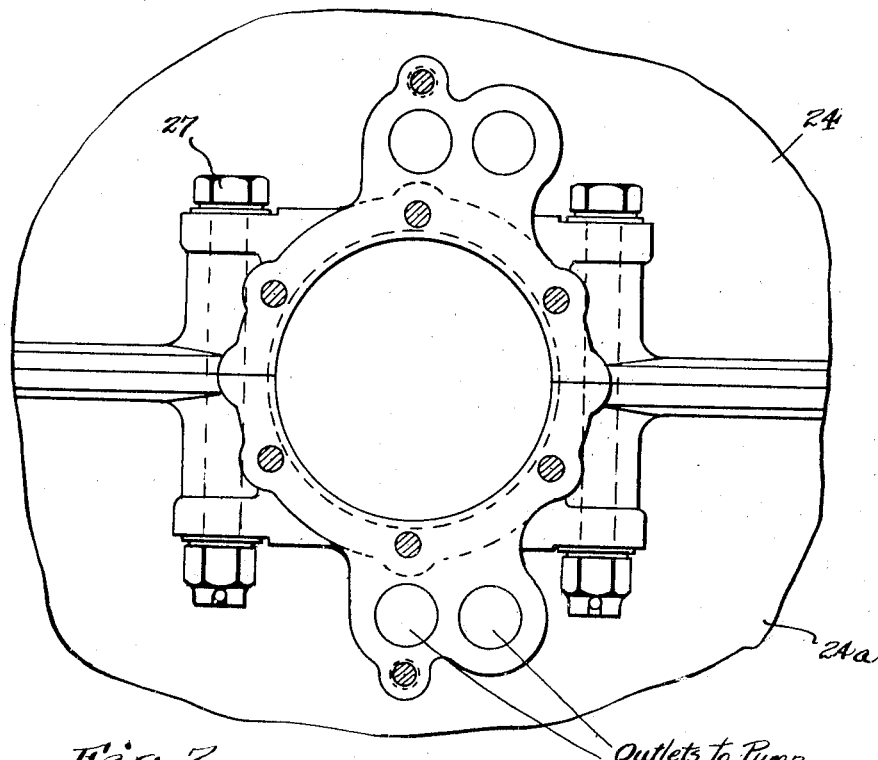

For a more detailed understanding of my invention reference may be had to the accompanying drawings illustrating in detail a preferred embodiment thereof, and in which like characters refer to like parts throughout the several views, and in which:

Fig. 1 is a diagrammatic fragmentary view of an aircraft showing an aircraft power plant and propeller drive assembly, Fig. 2 is a front elevational diagrammatic fragmentary view of an aircraft structure incorporating the power plant and propeller drive assembly illustrated in Fig. 1, Fig. 3 is a horizontal sectional view of the angle gear drive mechanism for connecting the propeller in driving relation with the engine and taken substantially on the line 3—3 of Fig. 2, Fig. 4 is a plan view of the gear casing associated with my proposed angle gear drive, Fig. 5 is another plan view of the gear casing having the angle drive, and which is assembled with the engine shown on the right side as shown in Figs. 1 and 2, Fig. 6 is an end view of this gear casing showing the pump assembly and the identical construction of the upper and lower gear casing sections, and Fig. 7 is a detail elevational view of the gear casing illustrating in detail the lubricant inlet and outlet ports.

Referring particularly to Figs. 1 and 2, it will be observed that the aircraft A is of substantially conventional construction and is provided with a fuselage 10 and laterally extending wing structures 11 and 11a which are connected with and supported by the fuselage 10. The left hand engine 12 is supported substantially within the wing structure 11 while the right hand engine 12a is supported substantially within the wing structure 11a. It will be noted that these engines 12 and 12a are supported within the wing structures so that the longitudinal axes 13 and 13a of said engines extend longitudinally of the wing structures. The engine cylinders 14 are arranged to lie horizontally, or in other words the plane containing the axes of the engine cylinders extends substantially parallel to the plane surface 15 of the wing structure in which the engine is housed.

If desired, additional engines 12c may also be used, these engines being positioned to lie for the most part within the wing structures and connected with drive shaft 20a extending to a point more remote from the fuselage 10. Because of the tapering construction of the wings the engines 12c are preferably located closer to the forward end of the fuselage and shafts 20a lie closer to the forward or leading edge of the wing structures than shafts 20.

It will be observed that this construction provides a compact assembly of the aircraft power plants, and that they are so supported as to facilitate engine maintenance while in flight. This is made possible by positioning the rear-end portion of each engine in such a way that same is preferably projected within the fuselage 10, and it is this rear-end portion which usually carries or supports the various accessory mechanisms 16. The engines project through an opening 17 in the fuselage side wall, so that access may be had to these engine accessories from the interior 10a of the fuselage 10. It will be obvious that the distance which said engine may project within the interior of the fuselage may be varied as desired, but I find it preferable in most instances to project the rear part of the engine into the interior of the fuselage substantially as shown in Figs. 1 and 2. The forward portion of the engine is, of course, supported within the wing structure and the engine crankshaft 18 is in each instance operatively connected with the driving shaft 19 by means of any suitable shaft extension 20, thus permitting the assembly therewith of a power drive connection in any desired location, since the extension 20 may be constructed of various lengths. It will be noted that the present assembly is very compact and access may be directly had to the engines even though the propeller shafts are widely spaced for driving extra large diameter propellers. In fact, in the present preferred assembly the engines 12 and 12a are supported rather close back to back as is illustrated in Fig. 1.

It will be apparent that this assembly is especially suited for assembly with an aircraft of the type herein illustrated since the relatively thinner or minimum height portion of the engine is the forward portion which is located the greatest distance within the wing structure, remote from the fuselage. One of the advantages noted with a construction such as I have developed, is that it has been possible to use a wing structure which is of minimum thickness in the plane of the propeller shaft, thereby making it possible to provide an aircraft which may attain relatively high speeds because of the minimum air resistance of the wing structure.

This aircraft power plant assembly illustrated in the accompanying drawings is drivingly connected with a propeller 21 mounted on a propeller shaft 22 which extends at an angle to the crankshaft 18 of the engines 12 and 12a. In the present instance the propeller shaft 22 extends at substantially a right angle to the engine crankshaft, the arrows in Figs. 1 and 2 indicating the direction of rotation of the engine crankshaft and propeller. My driving mechanism includes a reduction gear which is a unitary part of my angle drive.

My improved angle gear drive is illustrated in detail in Figs. 3 to 6 inclusive and it will be noted that the driving shaft 19 and driven shaft 23 are housed within a two part gear casing, comprising an upper section 24 and a lower section 24a. The plane of division of this two part gear casing is preferably in the plane of the axes 25 and 26 of the driving and driven shafts respectively and the two parts of this casing are preferably secured together by suitable bolts 27 as shown.

The driving shaft 19 is splined or otherwise suitably connected as at 28 with the drive shaft extension 20 and is supported in a suitable bearing 29. A bevelled gear 30 is driven by this shaft 19 through a vibration damping device 31 and the hub 32 of said bevelled gear is supported in a bearing 33 carried by the gear casing structure. The particular construction and operation of the damping devices illustrated herein are described and claimed in my co-pending application for patent, Ser. No. 354,715, filed August 29, 1940. The bevelled gear 30 meshes with another bevelled gear 34 secured to the driven shaft 23 by bolts or other conventional securing devices 35, the driven shaft being preferably supported in the casing structure by a bearing 36 at one end, and by a bearing 37 adjacent the other end.

It will be noted that the hub 32 is provided with an open end bore 38 and that the driven shaft 23 is provided with an annular rib 39 on which is accumulated a certain amount of lubricant, which is thrown off by centrifugal force and caused to be thrown into the interior 40 of the driving shaft portion 19a driven from said driving shaft 19. The lubricant forced into the interior of this driving shaft will find its way to the bearings 29 since the same is thrown by centrifugal force against the inner wall of this tubular driving shaft and flows through the oil ducts 41 into the bearing structure for lubricating same.

The driven shaft 23 has an extension 42 projecting through bearing 37 and is connected in a conventional manner with the oil pump mechanism (not shown) which is contained within the oil pump housing 43. The construction of this oil pump forms the basis of my United States Letters Patent, No. 2,278,110, dated March 31, 1942, and is therefore not described in detail in the present application.

It will be noted that if desired, the bevelled gears 30 and 34 may be of different pitch diameter so as to provide a speed change between the driving and driven shafts 19 and 23 respectively. A gear reduction mechanism is preferably interposed between the driven shaft 23 and the propeller shaft 22. I preferably employ a reduction mechanism constructed as described in detail and claimed in my co-pending application Ser. No. 293,098, filed September 1, 1939. In general, this reduction mechanism includes a driving member 43 which drives through ring gears 44 and pinions 45 mounted on a carrier 46 which is in turn drivingly connected with a driven shaft portion 47. The ring gear 48 is shown in my co-pending application as being fastened to the casing, but in the present instance this gear 48, which is splined to the internally splined ring gear 49, is connected to a torque meter structure 50 by means of arms 51. The shaft portion 47 may, if desired, carry a bevelled gear 53 which engages with a gear 54 driving a timing device or other suitable mechanism supported by the reduction drive casing 55. The shaft 47 is extended as at 56 and is splined to a member 57 which is in turn splined with the sleeve 58 bolted as at 59 to the flange 60 of the propeller shaft 22. Preferably the casing 55 carries bearings 61 which supports the shaft 47.

It will be noted that the reduction drive casing is secured or suitably bolted to the two part gear casing and forms a unitary structure with said two part casing. In fact the reduction drive casing 55 is also preferably formed of two halves and forms a gear box structure in assembly with casing parts 24 and 24a. The timing device 90 may be mounted in either of the openings 91 or 91a.

Observing particularly Figs. 4, 5 and 6, it will be noted that the upper and lower casing sections 24 and 24a are substantially identical in design. The angle drive, which is shown as connected with engine 12 in Fig. 1, is illustrated in Fig. 4 and it will be noted that this angle drive means includes a gear case and internal mechanism, this means comprising a unitary driving structure. When the gear case and contained mechanism is to be associated with an engine operating to drive the crankshaft in a reverse direction, such as is desired when using an assembly as shown in Fig. 5, this unitary driving structure is also adaptable for use with the reverse type of drive as well. The casing containing this gearing may be swung through an arc of 180 degrees about the axis 25 (indicated as A—A in Fig. 3) and thus what was the upper casing section 24 in Fig. 4 becomes the lower casing section in Fig. 5, and the lower casing section 24a in Fig. 4 becomes the upper casing section in Fig. 5. It will be noted that the arrows 70 indicate the direction of rotation of the crankshaft and arrows 71 indicate the direction of rotation of the driven shaft and propeller shaft in both assemblies illustrated in Figs. 4 and 5.

In Fig. 5 it will be noted that the rotation of the engine crankshaft and bevelled gear connected thereto are reversed with respect to the same parts shown in Fig. 4, and likewise the rotation of the bevelled gear 34 and propeller shaft 32 is also reversed with respect to the rotation of the same parts as illustrated in Fig. 4.

It will be thus noted that my construction makes it possible to use the same gear and gear casing assembly for both engines 12 and 12a, this gearing including the same angle drive and gear reduction mechanism for either a right or left hand drive. It will be obvious that certain markings may be placed on the casing so as to indicate the right position of the casing when it is assembled to the engine. This may be done in any suitable manner.

The manufacture of the construction herein illustrated is materially facilitated and same can be manufactured with a minimum of expense because of the fact that the same gear box and internal gears and other associated parts, are adaptable for either a right or left hand engine. This unitary construction including the angle drive and gear reduction mechanism is employed for both assemblies as illustrated in Figs. 4 and 5 without change.

Although I have described in detail but one application of my invention, it will be apparent to those skilled in the art to which my invention pertains, that various modifications and changes may be made therein without departing from the spirit of my invention or from the scope of the appended claims.

I claim:

1. An angle gear drive transmission for interchangeable assembly with right and left hand aircraft internal combustion engines and comprising a drive shaft drivingly connected with the engine, a driven shaft extending normal to the driving shaft, bevelled gears drivingly connecting said shafts, a propeller shaft and other accessories drivingly connected with said driven shaft, and a casing structure for housing said transmission and including means for supporting said driving and driven shafts, said casing comprising upper and lower sections constructed substantially identical and arranged to be interchanged one with the other for positioning the driven shaft in another position 180 degrees removed as same is swung about the driving shaft axis for operation with an engine of reverse crankshaft rotation, and supports for said accessories and propeller shaft respectively secured to said casing sections without being reversed in either of the interchanged positions aforesaid.

2. An angle gear drive transmission for interchangeable assembly with right and left hand aircraft internal combustion engines and comprising a drive shaft drivingly connected with the engine, a driven shaft extending normal to the driving shaft, bevelled gears drivingly connecting said shafts, a propeller shaft and other accessories drivingly connected with said driven shaft, and a casing structure for housing said transmission and including means for supporting said driving and driven shafts, said casing comprising upper and lower sections identical in construction and abutting in the horizontal plane containing the axes of said driving and driven shafts, said casing rotatable 180 degrees about the axis of the driving shaft to position same for a reverse angle drive and thus positioned for operation with an engine of reverse crankshaft rotation, said casing sections interchangeably connected with adjoining structures of the transmission.

3. An angle gear drive transmission for interchangeable assembly with right and left hand aircraft internal combustion engines and comprising a drive shaft drivingly connected with the engine, a driven shaft extending normal to the driving shaft, bevelled gears drivingly connecting said shafts, a propeller shaft and other accessories drivingly connected with said driven shaft, and a casing structure for housing said transmission and including means for supporting said driving and driven shafts, said casing comprising upper and lower sections identical in construction and abutting in the horizontal plane containing the axes of said driving and driven shafts, said casing rotatable 180 degrees about the axis of the driving shaft to position same for a reverse angle drive and thus positioned for operation with an engine of reverse crankshaft rotation, said casing sections constructed and arranged to provide interchangeable securing means and connections for selective connection with adjoining structures of said transmission.

4. An angle gear drive transmission for interchangeable assembly with right and left hand aircraft internal combustion engines and comprising a drive shaft drivingly connected with the engine, a driven shaft extending normal to the driving shaft, bevelled gears drivingly connecting said shafts, a propeller shaft and other accessories drivingly connected with said driven shaft, and a casing structure for housing said transmission and including means for supporting said driving and driven shafts, said casing comprising upper and lower sections identical in construction and abutting in the horizontal plane containing the axes of said driving and driven shafts, said casing rotatable 180 degrees about the axis of the driving shaft to position same for a reverse angle drive and thus positioned for operation with an engine of reverse crankshaft rotation, said casing sections constructed and arranged to provide interchangeable securing means and connections for selective connection with adjoining structures of said transmission, at least some of said structures being relatively fixed in position and now reversible.

JAMES W. KINNUCAN.